(12) United States Patent
Syed et al.

(10) Patent No.: US 9,384,729 B2
(45) Date of Patent: Jul. 5, 2016

(54) METHOD AND SYSTEM FOR DETECTING BOUNDARY OF COARTICULATED UNITS FROM ISOLATED SPEECH

(75) Inventors: Mohd Bilal Arif Syed, Kolkata (IN);
Arijit Sinharay, Kolkata (IN);
Tanushyam Chattopadhyay, Kolkata (IN)

(73) Assignee: Tata Consultancy Services Limited (IN)

( * ) Notice: Subject to any disclaimer, the term of this patent is extended or adjusted under 35 U.S.C. 154(b) by 352 days.

(21) Appl. No.: 14/128,871

(22) PCT Filed: Jul. 18, 2012

(86) PCT No.: PCT/IN2012/000503
§ 371 (c)(1),
(2), (4) Date: Dec. 23, 2013

(87) PCT Pub. No.: WO2013/054347
PCT Pub. Date: Apr. 18, 2013

(65) Prior Publication Data
US 2014/0214422 A1    Jul. 31, 2014

(30) Foreign Application Priority Data

Jul. 20, 2011  (IN) .......................... 2066/MUM/2011

(51) Int. Cl.
*G10L 15/00*    (2013.01)
*G10L 13/00*    (2006.01)
*G10L 19/00*    (2013.01)
*G10L 21/00*    (2013.01)

(Continued)

(52) U.S. Cl.
CPC ............... *G10L 15/063* (2013.01); *G10L 15/04* (2013.01); *G10L 2015/0631* (2013.01)

(58) Field of Classification Search
USPC ......... 704/200, 216, 217, 218, 231, 233, 237, 704/241, 246, 248, 251, 253, 256.8, 263
See application file for complete search history.

(56) References Cited

U.S. PATENT DOCUMENTS

| | | | | |
|---|---|---|---|---|
| 4,319,221 A | * | 3/1982 | Sakoe | ................... G06K 9/6206 382/215 |
| 4,571,697 A | * | 2/1986 | Watanabe | ................. G06T 7/60 704/238 |
| 4,888,823 A | | 12/1989 | Nitta et al. | |

(Continued)

FOREIGN PATENT DOCUMENTS

JP       2008-116588        5/2008

OTHER PUBLICATIONS

Fusaroli, Riccardo, Ivana Konvalinka, and Sebastian Wallot. "Analyzing social interactions: the promises and challenges of using cross recurrence quantification analysis." Translational Recurrences. Springer International Publishing, 2014. 137-155.*

(Continued)

*Primary Examiner* — Edgar Guerra-Erazo
(74) *Attorney, Agent, or Firm* — Finnegan, Henderson, Farabow, Garrett & Dunner, LLP

(57) ABSTRACT

The application provides a method and system for determinism in non-linear systems for speech processing, particularly automatic speech segmentation for building speech recognition systems. More particularly, the application enables a method and system for detecting boundary of coarticulated units from isolated speech using recurrence plot.

15 Claims, 1 Drawing Sheet

(51) Int. Cl.
*G10L 15/06* (2013.01)
*G10L 15/04* (2013.01)

(56) References Cited

U.S. PATENT DOCUMENTS

| | | | | |
|---|---|---|---|---|
| 4,984,275 | A * | 1/1991 | Watanabe | G01S 7/52025 |
| | | | | 704/255 |
| 5,210,820 | A | 5/1993 | Kenyon et al. | |
| 5,271,088 | A * | 12/1993 | Bahler | G10L 21/028 |
| | | | | 704/200 |
| 5,355,432 | A * | 10/1994 | Tanaka | G10L 15/10 |
| | | | | 704/234 |
| 5,812,739 | A * | 9/1998 | Hirayama | G10L 15/12 |
| | | | | 704/238 |
| 5,940,794 | A | 8/1999 | Abe | |
| 6,547,746 | B1 | 4/2003 | Marino | |
| 6,775,650 | B1 * | 8/2004 | Lockwood | G10L 21/0364 |
| | | | | 704/205 |
| 2006/0020458 | A1 * | 1/2006 | Kwon | G10L 17/02 |
| | | | | 704/246 |
| 2013/0158986 | A1 * | 6/2013 | Wiles | G06F 17/279 |
| | | | | 704/9 |

OTHER PUBLICATIONS

J.P. Eckman et al., "Recurrence Plots of Dynamical Systems", Department of Theoretical Physics, University of Geneva, Europhysics Letters, 4(9), pp. 973-977, Nov. 1987.

R. Dale et al., "Unraveling the Dyad: Using Recurrence Analysis to Explore Patterns of Syntactic Coordination Between Children and Caregivers in Conversation", Language Learning 56:3, pp. 391-430, Sep. 2006.

L. Lancia et al., "Cross-Recurrence Analysis of Speech Signals", Centre for General Linguistics (ZAS), Berlin, Jun. 2010.

N. Marwan et al., "Encounters with Neighbors: Current Developments of Concepts Based on Recurrence Plots and Their Applications", May 2003.

K. Roy, "Learning Words from Sights and Sounds: A Computational Model", Thesis for Doctor of Philosophy, MIT, 1999.

International Search Report mailed Apr. 10, 2013, in International Application No. PCT/IN2012/000503.

* cited by examiner

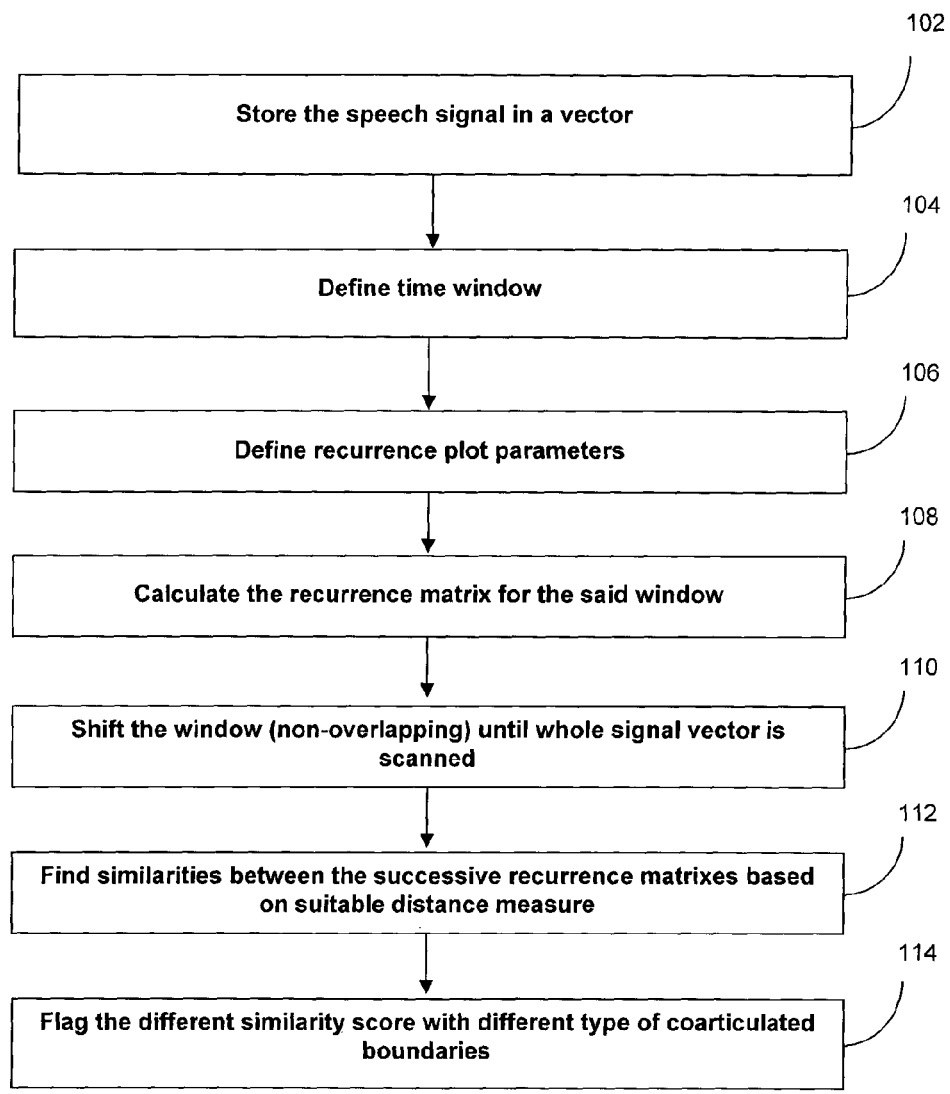

METHOD AND SYSTEM FOR DETECTING BOUNDARY OF COARTICULATED UNITS FROM ISOLATED SPEECH

CROSS-REFERENCE TO RELATED PATENT APPLICATIONS

This application is a National Stage Entry of International Application No. PCT/IN2012/000503, filed Jul. 18, 2012, which claims priority from Indian Patent Application No. 2066/MUM/2011, filed Jul. 20, 2011. The entire contents of the above-referenced applications are expressly incorporated herein by reference.

FIELD OF THE APPLICATION

The present application relates to speech data processing. Particularly, the application relates to determinism in non-linear systems for speech processing, particularly automatic speech segmentation for building speech recognition systems.

BACKGROUND OF THE APPLICATION

Automatic Speech segmentation is an important step for building speech recognition systems. Since the speech data is non-linear in nature, capturing and dealing with the non-linear speech data is a common and challenging problem.

In the current scenario, lots of approaches have been developed to capture the non-linear speech data and processing the same for segmentation, such as techniques of supervised learning, like support vector machines.

Existing speech segmentation methods have addressed the problem using supervised learning techniques, wherein the resultant segmentation of the speech data depends upon the classifier which has been used and the training set of the speech data. There have been several attempts made to use cross recurrence plot for speech processing or analysis, finding the coarticulated or transition boundary between vowel and consonants in the speech data particularly but the problem associated with supervised learning remain the same. Another drawback associated with the supervised learning is false alarming, which does not allow the effective processing of the non-linear speech signals.

In order to achieve an accurate detection of boundary of coarticulated units from isolated speech using recurrence plot, a statistical based method and system is required which could find the coarticulated or transition boundary between vowel and consonants using recurrence plot.

However, the existing methods and systems are not capable of providing a statistical based approach for detecting boundary of coarticulated units from isolated speech using recurrence plot. The existing methods and systems particularly are not capable of providing a statistical based determinism in non-linear systems for speech processing, particularly automatic speech segmentation for building speech recognition systems.

The existing methods and systems particularly are not capable of detecting boundary of coarticulated units from isolated speech using recurrence plot. Some of above mentioned methods known to us are as follows:

U.S. Pat. No. 6,547,746B to Marino teaches about a method and apparatus for evaluating the response of a biological or nonbiological system to an external or internal stimulus such as optical, thermal, auditory, tactile, taste, electrical, magnetic, chemical, biochemical, pharmacological, hormonal, internal cellular transformations, etc. This patent does not focus on the speech processing. The patent does not teach about detecting boundary of coarticulated units from isolated speech using recurrence plot.

JP2008116588A by Dai et sl. teaches about a one-dimensional time sequence signal analysis based on unstable chaos analysis, and from a two-dimensional image created by that, a feature is extracted by calculating an HLAC coefficient. The patent does not teach about detecting boundary of coarticulated units from isolated speech using recurrence plot.

Chandrasekaran in "A nonlinear dynamic modeling for speech recognition using recurrence plot—a dynamic bayesian approach" teaches about a novel nonlinear feature extraction technique based upon Recurrence Plot. This plot not only helps in visualizing the system dynamics but also can be quantified. Chandrasekaran teaches about the conventional use of recurrence plot, but it does not teach about detecting boundary of coarticulated units from isolated speech using recurrence plot.

Eckman et al. in "Recurrence Plots of Dynamical Systems" teaches about a new diagnostic tool which is called recurrence plot; this tool tests the above assumptions, and gives useful information also when they are not satisfied. Eckman et al. does not teach about detecting boundary of coarticulated units from isolated speech using recurrence plot.

Webber et al. in "Dynamical assessment of physiological systems and states using recurrence plot strategies" illustrates how recurrence plots can take single physiological measurements, project them into multidimensional space by embedding procedures, and identify time correlations (recurrences) that are not apparent in the one-dimensional time series. Webber et al. does not teach about detecting boundary of coarticulated units from isolated speech using recurrence plot.

Potsdam Institute for Climate Impact Research in "Recurrence plots and cross recurrence plots" teaches about a recurrence plot based methods (e.g. recurrence quantification analysis) of nonlinear data analysis. It does not teach about detecting boundary of coarticulated units from isolated speech using recurrence plot.

Dale et al. in "Unraveling the Dyad: Using Recurrence Analysis to Explore Patterns of Syntactic Coordination between Children and Caregivers in Conversation" introduces recurrence analysis as a means to investigate syntactic coordination between child and caregiver. Dale et al. does not teach about detecting boundary of coarticulated units from isolated speech using recurrence plot.

Lancia et al. in "Cross-recurrence analysis of speech signals" teaches about the mean length of the diagonal lines in a CRP which constitutes a reliable index of acoustic similarity among speech signals. Lancia et al. utilizes cross recurrence and inference is drawn from single window. Lancia et al. does not teach about detecting boundary of coarticulated units from isolated speech using recurrence plot.

The above mentioned prior arts fail to disclose an efficient method and system for detecting boundary of coarticulated units from isolated speech using recurrence plot. The prior art also fail to disclose about a method and system which for could find the coarticulated or transition boundary between vowel and consonants using recurrence plot.

Thus, in the light of the above mentioned background art, it is evident that, there is a long felt need for such a solution that can provide an effective method and system for detecting boundary of coarticulated units from isolated speech using recurrence plot. There is also a need for such a solution that enables a cost effective method and system could find the coarticulated or transition boundary between vowel and consonants using recurrence plot.

OBJECTIVES OF THE APPLICATION

The primary objective of the present application is to provide a method and system for detecting boundary of coarticulated units from isolated speech using recurrence plot.

Another objective of the application is to enable determinism in non-linear systems for speech processing, particularly automatic speech segmentation for building speech recognition systems.

Another objective of the application is to enable a method and system for finding the coarticulated unit boundary from isolated speech, such as transition boundary between vowel and consonants.

Another objective of the application is to enable a method and system for finding the coarticulated or transition boundary between vowel and consonants using recurrence plot.

Another objective of the application is to enable a method and system for showing the recurrence of states in a phase space for non-linear models revealing the dynamics of the system.

Another objective of the application is to enable a method and system for revealing important characteristics through interesting visual patterns using recurrence plot, when applied on speech data.

Another objective of the application is to enable a method and system for quantifying the visual patterns in numeric numbers so that automatic algorithms can be made to detect coarticulated unit boundary, such as transition between the vowels and consonants in a word.

Another objective of the application is to enable a method and system for applying general image processing/pattern matching techniques along with measuring statistical distances between the visual patterns of consecutive non-overlapping windows to infer on the information content in the system dynamics (audio signal).

SUMMARY OF THE APPLICATION

Before the present methods, systems, and hardware enablement are described, it is to be understood that this application in not limited to the particular systems, and methodologies described, as there can be multiple possible embodiments of the present application which are not expressly illustrated in the present disclosure. It is also to be understood that the terminology used in the description is for the purpose of describing the particular versions or embodiments only, and is not intended to limit the scope of the present application which will be limited only by the appended claims.

The present application provides a method and system for detecting boundary of coarticulated units from isolated speech using recurrence plot.

In one aspect of the application a method and system is enabling determinism in non-linear systems for speech processing, particularly automatic speech segmentation for building speech recognition systems. The method and system is provided for finding the coarticulated unit or transition boundary from isolated speech, such as transition boundary between vowel and consonants, using recurrence plot. The method and system is provided for showing the recurrence of states in a phase space for non-linear models revealing the dynamics of the system and revealing important characteristics through interesting visual patterns using recurrence plot, when applied on speech data. Further, the method and system is provided for quantifying the visual patterns in numeric numbers so that automatic algorithms can be made to detect coarticulated unit boundary, such as transition between the vowels and consonants in a word.

The above said method and system are preferably a method and system for detecting boundary of coarticulated units from isolated speech using recurrence plot but also can be used for many other applications, which may be obvious to a person skilled in the art.

BRIEF DESCRIPTION OF DRAWINGS

The foregoing summary, as well as the following detailed description of preferred embodiments, are better understood when read in conjunction with the appended drawings. For the purpose of illustrating the application, there is shown in the drawings exemplary constructions of the application; however, the application is not limited to the specific methods and system disclosed. In the drawings:

FIG. 1 shows flow diagram of the process for detecting boundary of coarticulated units from isolated speech using recurrence plot.

DETAILED DESCRIPTION OF THE APPLICATION

Some embodiments of this application, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present application, the preferred, systems and methods are now described.

The disclosed embodiments are merely exemplary of the application, which may be embodied in various forms.

The present application provides a method for detecting boundary of at least two co-articulated units from at least one isolated speech segment using a recurrence plot, characterized by enabling determinism in non-linear systems for speech segmentation, the method comprising processor implemented steps of:

a. storing at least one speech signal in at least one vector (102);

b. defining at least one time window (104) and recurrence plot parameters for the stored vector (106);

c. calculating at least one recurrence matrix for the defined time window (108);

d. shifting the non-overlapping window for scanning the stored signal vector (110);

e. finding at least one similarity between the successive recurrence matrixes based on suitable distance measure (112); and f. generating at least one similarity score for the similarity between the successive recurrence matrixes and flagging at least one similarity score with at least one type of coarticulated boundaries (114).

The present application provides a system for detecting boundary of at least two coarticulated units from at least one isolated speech using a recurrence plot, comprises utilizing the processor to:

a. store at least one speech signal in at least one vector (102);
b. define at least one time window (104) and recurrence plot parameters for the stored vector (106);
c. calculate at least one recurrence matrix for the defined time window (108);
d. shift the non-overlapping window for scanning the stored signal vector (110);
e. find at least one similarity between the successive recurrence matrixes based on suitable distance measure (112);
f. generate at least one similarity score for the similarity between the successive recurrence matrixes and flag at least one similarity score with at least one type of coarticulated boundaries (114).

Referring to FIG. 1 is a flow diagram of the process for detecting boundary of coarticulated units from isolated speech using recurrence plot.

The process starts at the step 102, the speech signal is stored in a vector. At the step 104, a time window is defined. At the step 106, recurrence plot parameters are defined.

At the step 108, the recurrence matrix is calculated for the said time window. At the step 110, the window (non-overlapping) is shifted until whole signal vector is scanned. At the step 112, similarities are found between the successive recurrence matrixes based on suitable distance measure. The process ends at the step 114, different similarity score are flagged different type of coarticulated boundaries.

Automatic Speech segmentation is an essential step for building speech recognition systems. Since speech data is non-linear in nature, recurrence plot has been used to handle the non-linear speech data, which can show the recurrence of states in a phase space for non-linear models revealing the dynamics of the system. When applied on speech data the recurrence plot technique reveals important characteristics through interesting visual patterns, which are further quantified in numeric numbers so that automatic algorithms may be made to detect coarticulated unit boundary, such as transition between the vowels and consonants in a word.

In one of the embodiment of the present application, transition boundary is detected between vowel and consonants, without having prior knowledge of the recurrence plot of particular vowels, which is known as unsupervised learning.

The current application also addresses the above said problem of non-linearity of speech data as recurrence plots are the tools which capture the determinism of a non-linear process. The present application utilizes the recurrence plot which is effective in dealing with non-linearity of speech signals, wherein the recurrence is a characteristic phenomenon in many dynamical systems. The property of the vowels being deterministic in nature is utilized, thus analyze the recurrence plots for such behavior which clearly distinguish between vowel and consonants.

In an embodiment of the present application, a method and system is provided for detecting boundary of coarticulated units from isolated speech using recurrence plot. The speech signal is received, isolated and stored in a vector. A visual pattern may also be quantified of the said isolated speech segment in the form of numeric character. A time window is defined for the said stored vector. Further, recurrence plot parameters are defined for the said stored vector. The recurrence of states in the said recurrence plot is shown in a phase space for non-linear model. A recurrence matrix is calculated for the said defined time window. The non-overlapping window is shifted until the whole stored signal vector is scanned. Similarity is found between the successive recurrence matrixes based on suitable distance measure. A similarity score is generated for the similarity between the successive recurrence matrixes, and similarity score are flagged with one type of coarticulated boundaries, wherein the coarticulated unit boundary is detected as transition boundary between at least one vowel and at least one consonant.

The methodology and techniques described with respect to the exemplary embodiments can be performed using a machine or other computing device within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set, of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a processor (e.g., a central processing unit (CPU), a graphics processing unit (GPU, or both), a main memory and a static memory, which communicate with each other via a bus. The machine may further include a video display unit (e.g., a liquid crystal displays (LCD), a flat panel, a solid state display, or a cathode ray tube (CRT)). The machine may include an input device (e.g., a keyboard) or touch-sensitive screen, a cursor control device (e.g., a mouse), a disk drive unit, a signal generation device (e.g., a speaker or remote control) and a network interface device.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The preceding description has been presented with reference to various embodiments. Persons skilled in the art and technology to which this application pertains will appreciate that alterations and changes in the described structures and methods of operation can be practiced without meaningfully departing from the principle, spirit and scope.

We claim:

1. A method for detecting boundary of at least two co-articulated units from at least one isolated speech segment, comprising:
   storing at least one speech signal in at least one vector;
   defining at least one time window and one or more recurrence plot parameters for the stored vector;
   calculating, via a processor, at least one recurrence matrix for the defined time window;
   shifting the time window for the stored vector;
   finding at least one similarity between successive recurrence matrixes based on a suitable distance measure;
   generating at least one similarity score for similarity between the successive recurrence matrixes; and
   flagging at least one similarity score with at least one type of coarticulated boundary.

2. The method as claimed in claim 1, wherein the at least one speech signal is associated with a non-linear isolated speech segment.

3. The method as claimed in claim 1, further comprising:
   quantifying at least one visual pattern associated with the at least one recurrence matrix via at least one numeric character.

4. The method as claimed in claim 1, wherein the at least one type of coarticulated boundary is a transition boundary between at least one vowel and at least one consonant.

5. The method as claimed in claim 1, further comprising:
   depicting recurrence of one or more states in a recurrence plot in a phase space for a non-linear model.

6. A system for detecting boundary of at least two coarticulated units from at least one isolated speech segment, comprising:
   a processor; and
   a memory storing processor-executable instructions to:
      store at least one speech signal in at least one vector;
      define at least one time window and one or more recurrence plot parameters for the stored vector;
      calculate at least one recurrence matrix for the defined time window;
      shift the time window for scanning the stored vector;
      find at least one similarity between successive recurrence matrixes based on a suitable distance measure;
      generate at least one similarity score for similarity between the successive recurrence matrixes; and
      flag at least one similarity score with at least one type of coarticulated boundary.

7. The system as claimed in claim 6, wherein the at least one speech signal is associated with a non-linear isolated speech segment.

8. The system as claimed in claim 6, the memory further storing processor-executable instructions to:
   quantify at least one visual pattern associated with the at least one recurrence matrix via at least one numeric character.

9. The system as claimed in claim 6, wherein the at least one type of coarticulated boundary is a transition boundary between at least one vowel and at least one consonant.

10. The system as claimed in claim 6, the memory further storing processor-executable instructions to:
    depict recurrence of one or more states in a recurrence plot in a phase space for a non-linear model.

11. A non-transitory computer-readable medium storing processor-executable instructions for detecting boundary of at least two coarticulated units from at least one isolated speech segment, the instructions comprising instructions to:
    store at least one speech signal in at least one vector;
    define at least one time window and one or more recurrence plot parameters for the stored vector;
    calculate at least one recurrence matrix for the defined time window;
    shift the time window for scanning the stored vector;
    find at least one similarity between successive recurrence matrixes based on a suitable distance measure;
    generate at least one similarity score for similarity between the successive recurrence matrixes; and
    flag at least one similarity score with at least one type of coarticulated boundary.

12. The medium as claimed in claim 11, wherein the at least one speech signal is associated with a non-linear isolated speech segment.

13. The medium as claimed in claim 11, further storing processor-executable instructions to:
    quantify at least one visual pattern associated with the at least one recurrence matrix via at least one numeric character.

14. The medium as claimed in claim 11, wherein the at least one type of coarticulated boundary is a transition boundary between at least one vowel and at least one consonant.

15. The medium as claimed in claim 11, further storing processor-executable instructions to:
    depict recurrence of one or more states in a recurrence plot in a phase space for a non-linear model.

* * * * *